Sept. 16, 1969 R. M. WILMOTTE 3,467,829

CORRELATION OF INFORMATION WITH ELECTRO-OPTICAL SCANNING

Filed May 10, 1966

INVENTOR
RAYMOND M. WILMOTTE

BY Paris, Haskell & Levine
ATTORNEYS

United States Patent Office 3,467,829

Patented Sept. 16, 1969

3,467,829

CORRELATION OF INFORMATION WITH ELECTRO-OPTICAL SCANNING

Raymond M. Wilmotte, 4917 Sedgwick St. NW., Washington, D.C. 20016

Filed May 10, 1966, Ser. No. 548,990
Int. Cl. G01n 21/30
U.S. Cl. 250—219 8 Claims

ABSTRACT OF THE DISCLOSURE

A system for pattern recognition is disclosed, wherein a pattern area is illuminated with light so that the light beam is modified by the pattern. The light beam is also modified by modulating different portions of the transverse area of the beam differently, as by intensity modulating these portions at different frequencies. In this way, each said portion of the light beam contains a frequency identification. The resultant total light beam is then integrated by a photocell, and the resultant waveform is characteristic of the pattern illuminated. Comparison of the waveform of the pattern with a reference waveform enables identification of the pattern.

The present invention relates to the art of processing information, particularly by electro-optical means, and is primarily concerned with the processing of information relating to the area of pattern recognition.

Processing information for purposes of pattern recognition, by the comparison of an unknown pattern or spatial display of information with a known reference informational pattern to determine if the two patterns are the same, involves the comparison of multiple parameters. With the existing state of the art, this type of information processing involves extremely complex, cumbersone, time-consuming, and expensive techniques and equipment, and it is the purpose of the present invention to simplify some of these operations. Although the description of the present invention is had with particular reference to this area of utility, it will be understood that the invention is not limited thereto and its principles and techniques are also applicable to other areas of information processing, as will be apparent to those skilled in the art.

Pattern recognition is basically a complex problem of correlation between an unknown pattern and a known reference pattern over a plurality of parameters defining the pattern. Considering a two dimensional pattern, for complete correlation between an unknown and a reference, one must ascertain: whether they are the same pattern; and if they are the same, what their relative relationships are with respect to position (i.e., their relative $x$ and $y$ coordinates), with respect to angular orientation ($\theta$), and with respect to scale ($\rho$).

The correlation process basically involves the multiplications of the ordinates of the two patterns, summing or integrating the products obtained, and plotting the result as the abscissas of the two patterns are shifted relative to one another. This correlation is usually considered applicable to a function of two parameters, such as time or distance, and nearly always time is the abscissa. But this is not an inherent limitation, for correlation can be applied to a function of any parameter. In the case of a pattern the four parameters above-enumerated, $x$, $y$, $\theta$, and $\rho$, are needed before the pattern can be described completely, in order to find out whether it is the same as another pattern. Only when these four parameters are known is it possible to superpose two patterns accurately which otherwise embody the same curve, function, or contour. Assuming the two patterns do embody the same curve, function, or contour, the normal correlation process involves the assumption of particular values for $y$, $\theta$, and $\rho$, then moving one pattern over the other along the $x$ axis to find if for these particular values of $y$, $\theta$, and $\rho$, there is one value of $x$ for which the patterns coincide. If the patterns are multiplied together and integrated, as in a correlation process, for each value of $x$, the coincidence of the pattern will show itself by a sharp peak in the correlation output when the value of $x$ is reached which corresponds to coincidence. If no coincidence is found for the particular values of $y$, $\rho$, and $\theta$ selected, all combinations of all possible combinations of values of $y$, $\rho$, and $\theta$ are taken one after the other, and the same process of moving one pattern over the other along the $x$ axis is followed. When this is done and the two patterns are indeed identical, there will be one point for which the correlation function is a maximum, and this point will give the values of $x$, $y$, and $\rho$ and $\theta$ which are necessary to produce coincidence.

This process is obviously lengthy and cumbersome, and it is the simplification of this basic or elementary process of locating the $x$ and/or $y$ coordinates that is the principal purpose of this invention.

To illustrate the invention, it is assumed for example, that the unknown pattern and the reference pattern with which it is to be compared are embodied on black and white transparencies, i.e., a combination of opaque and transparent areas. A light beam is applied to and selectively transmitted through each of the transparencies in accordance with the patterns hereon, and the entire light transmitted through each transparency is focused upon and integrated by a respective photocell and converted into an electrical signal. Further in accordance with this invention, these applied light beams are identically modulated or coded in a characteristic manner in order to individually identify the different portions of the illuminated areas of the patterns being analyzed. One such manner of modulation, for example, comprises intensity modulating the light beam at frequencies which differ in accordance with a linear function along a coordinate of the pattern, to provide a different and characteristic modulating frequency at each point along said coordinate. This type of modulation in this specification and the appended claims is called for convenience a "linear frequency ramp" along the coordinate referred to.

Consequently the electrical signals generated by the photocells in integrating the entire portions of the light beams transmitted through the patterns have complex waveforms which are respective functions of the patterns on the two transparencies and of their orientations in the transverse areas of the respective beams of light. The electrical signal outputs of the two photocells are mixed, and if it be assumed that the patterns on the two transparencies are actually the same and superimposable, but are displaced relative to each other along the axis of the frequency ramp modulation on the respective light beams, the mixer output contains a beat frequency indicative of the relative displacement along said axis. Therefore, said mixer output is fed to a spectrum analyzer, by which the amount of said displacement is ascertained.

Accordingly, one object of the present invention is to provide for the conversion of a spatial distribution of intelligence into a waveform in the time domain, which is a function of said intelligence, wherein, however, time is not an element in the intelligence function.

Another object of the present invention is to provide for the conversion of a two dimensional informational pattern into an electrical waveform which is a function of the information of the pattern.

Another object of the present invention is to provide for said conversion by utilizing a modulated or coded energy source for simultaneously illuminating the entire area of said pattern and integrating the entire energy image thus derived from said pattern.

Still another object of the present invention is to provide for said conversion by utilizing a modulated or coded light source for simultaneously illuminating the entire area of said pattern and photoelectrically integrating the entire light image thus derived from said pattern.

And another object of the present invention is to provide for the comparison of certain parameters of two patterns in the process of ascertaining the existence of identity therebetween.

Other objects and advantages of the present invention will become apparent to those skilled in the art, from a consideration of the following detailed description of several exemplary specific embodiments thereof, had in conjunction with the accompanying drawings, in which like reference characters designate like or corresponding parts, and wherein.

Figure 3:
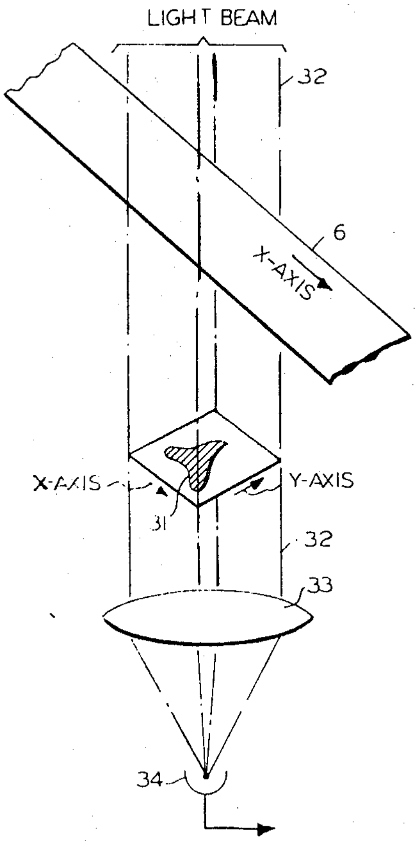
Figure 4:
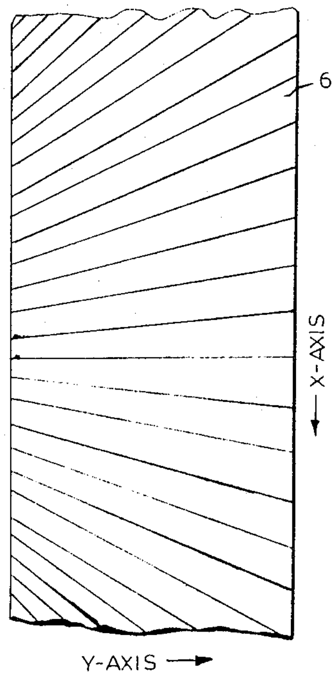

FIG. 3 is a schematic illustration of a system for generating a light beam modulated with a frequency ramp along one of its axes or coordinates, and for applying such a modulated light beam to a pattern being analyzed and collecting the light output derived from the pattern upon a photocell; and FIG. 4 is a detailed qualitative showing of a strip used in FIG. 3 for modulating the light beam with a frequency ramp.

For pattern recognition, one principle used in the present invention is to apply to at least one of the parameters of the pattern under consideration a specific code or modulation. For instance, one may select a linear frequency ramp as a code for identifying the various values or points along the $y$ parameter or $y$ coordinates of the pattern. It is assumed for the present illustration that the correct values for $\rho$ and $\theta$ are known. This code can be applied by illuminating the subject pattern with a light beam which is intensity modulated in accordance with the aforedescribed linear frequency ramp along its $y$ axis. Of course where the light beam is thus modulated only along its $y$ axis, it is apparent that for any given $y$ position the modulating frequency remains the same for all values along the $x$ axis. Thus, the light modulation frequency applied at any point to the pattern can be expressed as $$f=f_{oy}+f_y \cdot y$$

The entire light obtained either by transmission or reflection from the illuminated pattern is collected by means of a lens and focused onto a photocell. The output of the cell is therefore a complex electrical waveform which is a function of the subject pattern and of the coded illumination. If a reference pattern identical to the subject pattern is treated in an identical manner, and if the two patterns are relatively displaced in their respective illuminating beams along the $y$ axis by an amount $\Delta y$, when the two waveforms out of the respective photocells are mixed, the product of the two waveforms contains the beat frequency of the simple sine wave sin $(2\pi \Delta y f_y t)$. Thus, by feeding the mixer output to a bank of filters, each of which passes a specific frequency, that filter which responds to the particular frequency $\Delta y . f_y$ present in the correlation function signal will give the maximum response, thereby denoting the value of $\Delta y$. Obviously, the same operation can be performed relative to the $x$ axis of the two patterns, either by shifting the light modulation pattern or the patterns themselves by 90°.

Figure 1:
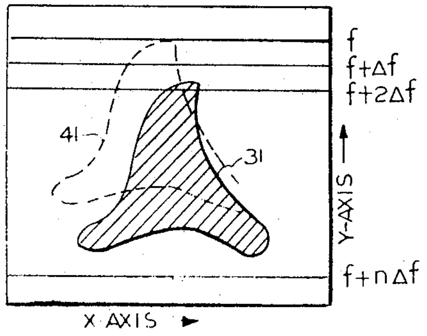
FIG. 1 is a graphical representation of two patterns being compared, and illustrating the linear frequency ramp previously defined.
Figure 2:
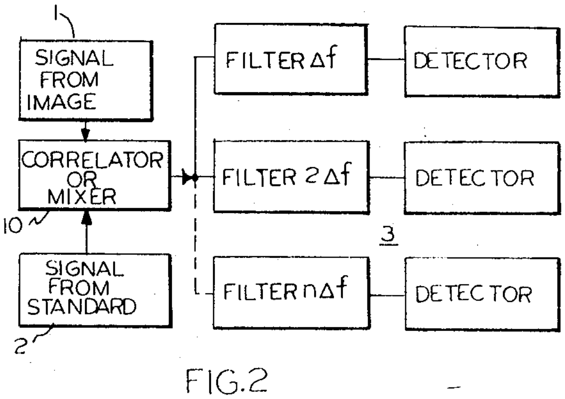
FIG. 2 is a block diagram of a spectrum analyzer utilized in practicing the present invention.

The principles of the present invention discussed hereinabove are illustrated in FIGS. 1–4. FIG. 1 shows two identical patterns, the solid line and shaded pattern 31 corresponding to a reference pattern, and the dashed line and unshaded pattern 41 to the unknown pattern. Both patterns are illuminated simultaneously and separately with respective light beams modulated with a given linear frequency ramp along the $y$ axis. Thus, the line across each pattern for each value of $y$ is modulated with a different frequency as indicated by $f$, $f+\Delta f$, $f+2\Delta f$ . . . $f+n\Delta f$. The two waveforms obtained by condensing the separate light images of the two patterns on respective photocells are similar but one is shifted in frequency relatively to the other, this difference in frequency, $r\Delta f$, representing a relative displacement of a distance represented by $r$ along the $y$ axis. These two waveforms are mixed in a mixer 10 as shown in the block diagram of FIG. 2, and the mixer output contains a sinusoidal beat frequency $r\Delta f$. This beat frequency is detected by a spectrum analyzer 3 represented by filters $\Delta f$, $2\Delta f$ . . . $n\Delta f$ in FIG. 2 coupled to respective detectors.

FIG. 3 shows schematically the means for electro-optically converting the two dimensional patterns into a waveform pursuant to the present invention. The pattern 31 for purposes of illustration is a black and white transparency. A collimated light beam 32 first traverses moving tape transparency 6 which carries a pattern adapted to produce a desired intensity modulation of the light beam 32. This modulator 6 moves along the $x$ axis to modulate the light beam 32 before it is incident on the transparency pattern 31. The total light traversing this system is focussed on photocell 34 by means of a lens 33, to produce an electrical waveform which is a function of the pattern 31, its position on the $y$ axis, and the modulation imposed on the light beam 32 by modulator strip 6. A similar process is carried out on the pattern 41 using an identical or the same modulator strip, and the waveforms of the two patterns as collected and integrated by the respective photocells constitute the inputs 1 and 2 to mixer 10 in FIG. 2.

In FIG. 3 the light beam 32 is modulated with a frequency ramp along the $y$ axis. A possible pattern that may be carried by the modulator strip 6 for this purpose is shown in FIG. 4. The pattern is drawn schematically for illustrative purposes only, and is not intended to be quantitatively correct. It represents a pattern which when moved through the light beam 32 along the $x$ axis as indicated by the arrow in FIG. 3 will produce the aforedescribed linear frequency ramp along the $y$ axis of the light beam 32.

It is clear that other patterns and other modulations can be used for the modulator strip 6 and the light beam 32. It is also apparent that the optical system shown in FIG. 3 is schematic only, and if high accuracy and resolution is required, it may be desired to provide an optical system that actually images modulator strip 6 on pattern transparency 31.

The aforedescribed specific example of the present invention relies upon a linear frequency ramp modulation of light beam 32 along the $y$ axis to ascertain the magnitude of relative displacement along the $y$ axis of the unknown or subject pattern 31 and the reference pattern 41 in their respective light beams. The same system may readily be used to obtain the relative displacement along the $x$ axis of the two patterns 31 and 41. This may be accomplished either by rotating the patterns 31 and 41 by 90° to reverse the $x$ and $y$ axes, or by rotating the orientation of the modulating tape 6, so that it travels along the $y$ axis providing the frequency ramp along the $x$ axis. The two output waveforms combined in mixer 10 would then provide through spectrum analyzer 3 the value of the beat frequency indicative of the $x$ axis relative displacement of the two patterns 31 and 41.

Also, it will be apparent to those skilled in the art of information theory that the single axis modulation of the light beam 32 can be expanded to a simultaneous modulation of the beam along two axes ($x$ and $y$), such as by using two angularly displaced modulating tapes 6, designed so that the waveforms produced for all the resolution elements are orthogonal.

Accordingly, there is provided by the present invention a mode of converting a spatial display into a waveform which is a function of that display, and a mode of utilizing that technique to ascertain certain aspects of the orientation of that pattern relative to another like pattern. It is understood that the specific embodiment herein described is presented for purpose of illustration only, and various modifications will be apparent to those skilled in the art. For example, other means for providing a linear frequency ramp along one axis of the transverse area of the light beam may be employed; and patterns of coding other than a linear frequency ramp might be utilized. Therefore, such modifications and variations of the foregoing illustrative description of the invention as are embraced by the spirit and scope of the appended claims, are contemplated as being within the purview of this invention.

What is claimed is:

1. A method of inspecting information from a given area comprising the steps of applying a beam of energy to all portions of said area simultaneously, said energy being of a type capable of modification by said information whereby said beam is modified by said information, intensity modulating different portions of said energy beam with a repetitive frequency function which is simultaneously different for each said portion, and integrating the energy of said modulated and modified beam simultaneously for said entire area, whereby the integrated form of said energy is a function of information contained in said area.

2. A method as set forth in claim 1, and including the further step of analyzing the integrated form of said energy to derive said information.

3. A method as set forth in claim 2, wherein said analysis is accomplished by relating said integrated energy of a form definitive of reference information.

4. A method as set forth in claim 1, wherein said portions are successive increments along at least one transverse axis of the beam.

5. A system for inspecting information displayed over a given area, comprising means for illuminating all portions of said area simultaneously with a beam of energy, said energy being of a type capable of modification by said information whereby said beam is modified by said information, means for intensity modulating different portions of said energy beam with a repetitive frequency function which is simultaneously different for each said portion, and means for integrating the energy of said modulated and modified beam simultaneously for said entire area and providing an output which is a function of information contained in said area.

6. A system as set forth in claim 5, and further including means for analyzing said output to derive said information.

7. A system as set forth in claim 6, wherein said analyzing means includes means for correlating said output with reference information.

8. A system as set forth in claim 5, wherein said portions are successive increments along at least one transverse axis of the beam.

References Cited

UNITED STATES PATENTS

| | | | |
|---|---|---|---|
| 3,189,746 | 6/1965 | Slobodin et al. | 210—216 |
| 3,227,034 | 1/1966 | Shelton | 340—146.3 |
| 3,246,295 | 4/1966 | DeClaris et al. | 340—146.3 |
| 3,255,436 | 6/1966 | Gamba | 250—237 |
| 3,292,148 | 12/1966 | Gioliano et al. | 340—146.3 |

WALTER STOLWEIN, Primary Examiner

U.S. Cl. X.R.

250—237; 340—149